United States Patent
Wu et al.

(10) Patent No.: US 7,850,853 B2
(45) Date of Patent: Dec. 14, 2010

(54) FLOATING POROUS HOLLOW FIBER MEMBRANE BUNDLE

(75) Inventors: Yang Wu, Zhejiang (CN); Xiang Li, Zhejiang (CN); Zhiming Tong, Zhejiang (CN)

(73) Assignee: Zhejiang Environmental Engineering Company Limited, Shanghai (CN)

( * ) Notice: Subject to any disclaimer, the term of this patent is extended or adjusted under 35 U.S.C. 154(b) by 512 days.

(21) Appl. No.: 11/795,340

(22) PCT Filed: Jul. 4, 2005

(86) PCT No.: PCT/CN2005/000979

§ 371 (c)(1),
(2), (4) Date: Apr. 15, 2008

(87) PCT Pub. No.: WO2006/094436

PCT Pub. Date: Sep. 14, 2006

(65) Prior Publication Data

US 2009/0026140 A1    Jan. 29, 2009

(30) Foreign Application Priority Data

Mar. 9, 2005   (CN) .......................... 2005 1 0049324

(51) Int. Cl.
*B01D 61/14* (2006.01)
*B01D 61/18* (2006.01)
*B01D 63/04* (2006.01)

(52) U.S. Cl. ........................ 210/650; 210/200; 210/203; 210/232; 210/252; 210/258; 210/321.69; 210/321.79; 210/321.8; 210/391; 210/407; 210/409; 210/416.1; 210/437; 210/441; 210/442; 210/500.23; 210/636; 210/649

(58) Field of Classification Search ................. 210/636, 210/649, 650, 106, 200, 203, 232, 252, 258, 210/314, 321.69, 321.79, 321.8, 391, 407, 210/409, 416.1, 437, 441, 442, 500.23
See application file for complete search history.

(56) References Cited

U.S. PATENT DOCUMENTS 4,540,490 A     9/1985   Shibatua et al.

(Continued)

FOREIGN PATENT DOCUMENTS

CN    20042008.1689.7    7/2005

(Continued)

*Primary Examiner*—John Kim

(57) ABSTRACT

The invention discloses a kind of porous membrane filtration component for treating water, specifically it discloses a kind of suspending porous hollow fiber membrane bundle for treating highly turbid waste water. The component includes some porous hollow fiber membrane yarns and casting heads arranged at both ends of respective yarns, wherein the connections between the said casting heads and membrane filtration module are flexible connections, at least one end of the flexible connection the cast header is connected with a hollow tube or cord, and the membrane bundle hangs on the said membrane filtration module, suspending freely. The invention provides a suspending porous hollow membrane bundle that can effectively remove contaminants adhered to the surface of the membrane yarns, makes its membrane yarns difficult to rupture, has a longer service life, and produces water with steady quality. It solves the technical problems in the present hollow fiber filtration component which includes membrane yarns that are entangled with each other and easily ruptured, thus leading to a lower quality of the product water.

15 Claims, 5 Drawing Sheets

U.S. PATENT DOCUMENTS

| | | | |
|---|---|---|---|
| 4,547,289 A | 10/1985 | Okano et al. | |
| 4,876,006 A | 10/1989 | Ohkubo et al. | |
| 4,886,601 A | 12/1989 | Iwatsuka et al. | |
| 5,209,852 A | 5/1993 | Sunaoka et al. | |
| 5,472,607 A | 12/1995 | Milvaganam et al. | |
| 5,480,553 A | 1/1996 | Yamamori et al. | |
| 5,482,625 A | 1/1996 | Shimaizu et al. | |
| 5,639,373 A | 6/1997 | Mahendran et al. | |
| 5,643,455 A | 7/1997 | Kopp et al. | |
| 5,922,201 A | 7/1999 | Yamamori et al. | |
| 5,944,997 A | 8/1999 | Pedersen et al. | |
| 6,126,819 A | 10/2000 | Heirne et al. | |
| 6,280,626 B1 | 8/2001 | Miyashita et al. | |
| 6,325,928 B1 | 12/2001 | Pedersen et al. | |
| 6,592,759 B2 | 7/2003 | Rabie et al. | |
| 6,630,069 B2 | 10/2003 | Sakashita et al. | |
| 6,656,356 B2 | 12/2003 | Gungerich et al. | |
| 7,018,533 B2 | 3/2006 | Johnson et al. | |
| 7,022,231 B2 | 4/2006 | Mahendran et al. | |
| 7,063,788 B2 | 6/2006 | Mathendran et al. | |
| 7,122,121 B1 | 10/2006 | Ji | |
| 7,169,295 B2 * | 1/2007 | Husain et al. | 210/150 |
| 7,179,370 B2 | 2/2007 | Dimitriou et al. | |
| 7,255,788 B2 | 8/2007 | Okazaki | |
| 2003/0038075 A1 | 2/2003 | Akimoto et al. | |
| 2004/0188339 A1 | 9/2004 | Murkute et al. | |
| 2005/0115899 A1 | 6/2005 | Husain et al. | |
| 2008/0000832 A1 | 1/2008 | Liu et al. | |

FOREIGN PATENT DOCUMENTS

| | | |
|---|---|---|
| JP | 61-149208 | 7/1986 |
| JP | 61-192309 | 8/1986 |
| JP | 07-136471 | 5/1995 |
| JP | 10-137552 | 5/1998 |
| WO | WO 2006/094435 | 9/2006 |

* cited by examiner

FLOATING POROUS HOLLOW FIBER MEMBRANE BUNDLE

CROSS REFERENCE TO RELATED APPLICATIONS

This application is filed pursuant to 35 USC 371 based upon PCT/CN2005/000979 filed 4 Jul. 2005, which claims the benefit of Chinese Application No. 200510049324, filed 9 Mar. 2005.

FIELD OF THE INVENTION

This invention relates to a porous membrane filtration component for treating water, particularly a type of suspending porous hollow fiber membrane bundle for the treatment of highly turbid waste water.

BACKGROUND OF THE INVENTION

In recent years and with the development of membrane technology, membranes have more and more applications in waste water treatment. However, in the application process, particularly in the treatment applications of waste water with high turbidity, the problem of membrane fouling has not been well resolved. With the improvement of membrane material properties and the reduction of membrane price, the control of membrane fouling has gradually become the main factor that limits its extensive application.

In order to improve the evenness of water flow, permeation efficiency, and to resolve the fouling and blockage problems of the applied membrane, the importance of an optimized design for membrane modules has become more and more significant. Particularly during the application of direct filtration of highly turbid waste water with hollow fiber porous membrane, there emerges a module composed of hollow fiber porous membrane that can be directly immersed in a raw water tank or biochemical tank to perform filtration, generally both ends of the hollow fiber membrane bundles are respectively connected with water-collecting boards (tube) that are separated but standing face to face, kept loose without contact, and set in the water to be treated. The mentioned hollow fiber membranes can use known polyvinylidene fluoride, polyethylene, polyvinyl chloride, polypropylene, polyether sulfone or polysulfone materials, etc. Generally, there are independent aeration and cleaning components setup under the membrane module, so the membrane bundles are in a buffeting state to prevent begriming over the membrane surface and guarantee a high flow rate of the porous membrane in the filtering of highly turbid water. The layout form for the mentioned hollow fiber membrane bundles can be in a curtain shape, cuboid shape or cylinder shape.

Immersion type membrane modules have been widely used. The published or approved patents include Chinese patent CN1331124A, CN1509801A, CN1121895C (U.S. Pat. No. 6,630,069) and U.S. Pat. No. 6,790,360. The abovementioned immersion type membrane modules have all resolved the anti-fouling and anti-blockage properties of the hollow porous membrane yarns to a certain degree, prolonging the lifespan and operating cycles of the modules to a certain degree as well. Both ends of the hollow fiber membrane yarns for the abovementioned membrane modules generally were inserted into the sealed water-collecting tubes that are set face to face. Because the membrane yarns inside the membrane modules were not restrained by a shell and although the buffeting freedom of the membrane yarns was improved under the effect of aeration system, in order to prevent the entanglement among the membrane yarns, the length of the membrane modules should not be very long. For example, in U.S. Pat. No. 6,790,360 the optimized length for membrane yarns is suggested to be 0.7 meter.

Even so, immersion type porous membrane modules still have became a trend and direction for membrane module design in the sewage and waste water treatment field, and the membrane module structure and craft have been continuously improved. There is a curtain type immersion module including two vertically arranged upper and lower water-collecting tubes and hollow fiber membrane bundles in the middle. The feature is that the hollow fiber membrane bundle located between the upper and lower water-collecting tubes, could move right and left within a certain range, and the lower water-collecting tube could also shift up and down within a certain range, which provides the membrane bundle with a certain flexibility to improve anti-fouling capability of the membrane module. For another example, US Patent US2004/0188339A1 describes an immersion module type membrane filtration device with an exchangeable membrane module with an aeration tube installed in the membrane bundles. Not only is the maintenance problem for the membrane module to a certain degree resolved and non-stop operation realized, but also the aeration structure of the device and the anti-fouling property of the membrane yarns are improved.

In the above technologies, consideration was not given to the maintenance of the membrane module, the anti-fouling property of the membrane yarns and the technical problem of water productivity for the complete membrane filtration device in all the designs of the membrane modules.

The purpose of this invention is to provide a suspending hollow fiber porous membrane filtration module that can effectively prevent the entanglement of membrane yarns, effectively remove pollutants on the surface of membrane yarns, wherein the membrane yarns do not rupture easily, the membrane modules have a long lifespan with stable water production quality.

SUMMARY OF THE INVENTION

This invention mainly provides for a suspending hollow fiber porous membrane filtration module with a reasonable structure that can effectively prevent entanglement of membrane yarns, effectively removes pollutants on the membrane yarn surfaces which are difficult to rupture, provide a long application lifespan for the membrane module and provide steady water production quality. It can resolve the pre-existing technical problem in the hollow fiber membrane filtration module e.g. the entangled membrane yarns and easily rupture-able membrane yarn which leads to the technical problem of low water production quality. This invention also provides convenient maintenance or exchanging of the membrane module for the whole membrane filtration equipment.

The above technical problems in this invention are resolved through the technical scheme listed below: a suspending porous hollow fiber membrane bundle, comprising some porous hollow fiber membrane yarns and casting heads fixed on both ends of them and the casting heads of the fixed membrane bundles are connected with two ends of the membrane filtration module in flexible connection with a hollow tube or cord on the casting head of at least one end of the flexible connection, the casting head is connected with the membrane filtration module in a suspending state. The hollow fiber porous membrane bundle is completely immersed in the liquid to be filtered during the process, and the casting heads at both ends of the membrane bundle can move within a certain range, so in the process, not only can the membrane yarns suspend-swing and contact each other with water flow and air flow, but also the whole membrane bundle can move in a certain range, resulting in the improvement of the removal of the contaminants off the membrane yarn surface. Chiefly because the casting heads at both ends of the membrane bundle can move within a certain range, when the membrane yarns move under the effect of water and air flows, the casting heads at both ends of the membrane bundle can move simultaneously also, then the oscillation angle between the membrane yarn roots and the casting surface and the possibility of root rupture is significantly reduced, and reliability is improved. The casting head at one end of the membrane bundle is connected with the water-collecting system of the membrane filtration module through a hollow flexible tube, the casting head at the other end of the membrane bundle can be connected with the water-collecting system of the membrane filtration module through a hollow flexible tube, or directly connected with the other end of the module through a cord, then the flexible connection between the membrane bundle and the membrane filtration module is accomplished. The cord includes known flexible connection materials such as cords, springs, etc. Of course, for the flexible connection between the membrane bundle and the membrane filtration module as well as the free suspending state for the membrane bundle in the water to be treated, any present known method can be adopted, for example, cord connection is adopted for both ends of the membrane bundle to make the membrane bundle suspend in the water to be treated, then the water outlet tube can connect to a certain location between the two casting heads for transportation of the produced water; or the membrane yarns can be divided into two sections, and a fixture can be placed between the membrane yarns to collect the produced water from both ends, and connection between the flexible tube and the water production system is for the transportation of the produced water.

Both ends of the membrane yarns can be open, or only the water outlet end can be open.

As an optimal choice, both ends of the hollow fiber membrane yarns are casted into cylinder shapes, and placed into the cup to form the casting heads with cavities. Both ends of the membrane yarns are open and placed inside the cavities, wherein the inner cavities of the both ends are connected with hollow flexible tubes. The cavities are water-collecting chambers. The hollow tubes at both ends are water outlet tubes. The flexible connections on both ends are implemented by the water outlet tubes, the cavities on both ends of the casting heads. One end of the water outlet tube is connected with the cavity of the casting head, the other end is connected with the water production system of the module for transporting of the produced water.

As an optimal choice, both ends of the hollow fiber membrane yarns are casted into cylinder shapes, and placed into the cup to form the casting heads with cavities. One end of the membrane yarn is open and placed inside the cavity for the connection to the hollow tube, and the cavity is a water-collecting chamber. The other end of the membrane yarn is sealed. The cavity of this end is connected with a cord or air distribution tubeOne end of the flexible connection is water outlet tube for connection with the production system of the module for transportation of produced water. The other end of the flexible connection can be a flexible tube or cord. If a tube is used, it is connected with the air supply system of the module for air distribution and the cavity would become the air distribution chamber; if a cord is used, the flexible connection between casting head and the module is realized to make the ends of the membrane yarns move with the casting head to reduce stress around the root and the possibility of end rupture.

As an optimal choice, a hollow tube is set in the hollow fiber membrane yarn. The hollow tube can be used as the transportation tube for the produced water connected with the water-collecting chamber in at least one end of the membrane bundle, whose ends are connected with the two ends of the casting heads respectively to transport the produced water inside the cavities of two casting heads. It can also be used as the air distribution tube connected to the air distribution chamber on one end of the membrane bundle there are several air distribution holes on the tube. Using a hollow tube as the air distribution tube can more effectively sweep the membrane yarns, and an air distribution tube set-up can better sweep the roots of the membrane yarns to prevent the fouling on the roots from blockage of the membrane yarns or even causing the rupture of the membrane yarns.

As an optimal choice, the length of said hollow tube is larger than the distance between the two casting heads fixed on the membrane bundle but smaller than the length of the hollow fiber membrane yarn. The damage on the membrane yarn caused by high oscillation amplitude of the membrane bundle can be prevented, so the membrane bundle is protected.

As an optimal choice, the cord is set in the hollow fiber membrane yarn with both ends of the cord connected with the casting heads fixed on both ends of the membrane yarn respectively, its length is larger than the distance between the casting heads on the membrane bundle but smaller than the length of the hollow fiber membrane yarn. The damage on membrane yarns caused by the high oscillation amplitude of the membrane bundle can be prevented, which protects the membrane bundle.

As an optimal choice, an air distribution tube is installed in the center of the casting head at the end of the hollow fiber membrane yarn. There are air distribution holes over it, with one end of the air distribution tube as free end extending to the middle of the membrane yarn and the other end connecting to the air distribution system.

As an optimal choice, at least one end of casting head on two ends of the membrane bundle is connected with the water-collecting system or air distribution system of the membrane filtration module through a hollow flexible tube.

The suspending hollow fiber porous membrane bundle can not only be used in an immersion type super-filtration device, but it can also be used in a membrane biological reaction device. The suspending hollow fiber porous membrane bundle can be connected with the corresponding hangers of the membrane module through flexible hanging cords or connected with the water-collecting system or air supply system of the module through water outlet tube or air inlet tube. Several said suspending hollow fiber porous membrane filtration modules can be fixed to the corresponding hanger brackets through the module hangers. The water-producing flexible tube for the module is connected parallel to the water collecting tube and the air inlet flexible tube is connected parallel to the compressed air tube, then a filtration system is formed to adjust to the filtration system in different water generation scales.

This invention has the features of a simple structure, reasonable layout, compact device, convenient production, small area requirement, low energy consumption, simple operation, good water quality, high treatment efficiency and longer operational cycle, etc. It can be used alone or in con-

DESCRIPTION OF THE PREFERRED EMBODIMENTS

Through the examples and the attached diagrams, the detailed description for the technical scheme in this invention is made as follows.

Example 1

Figure 1:
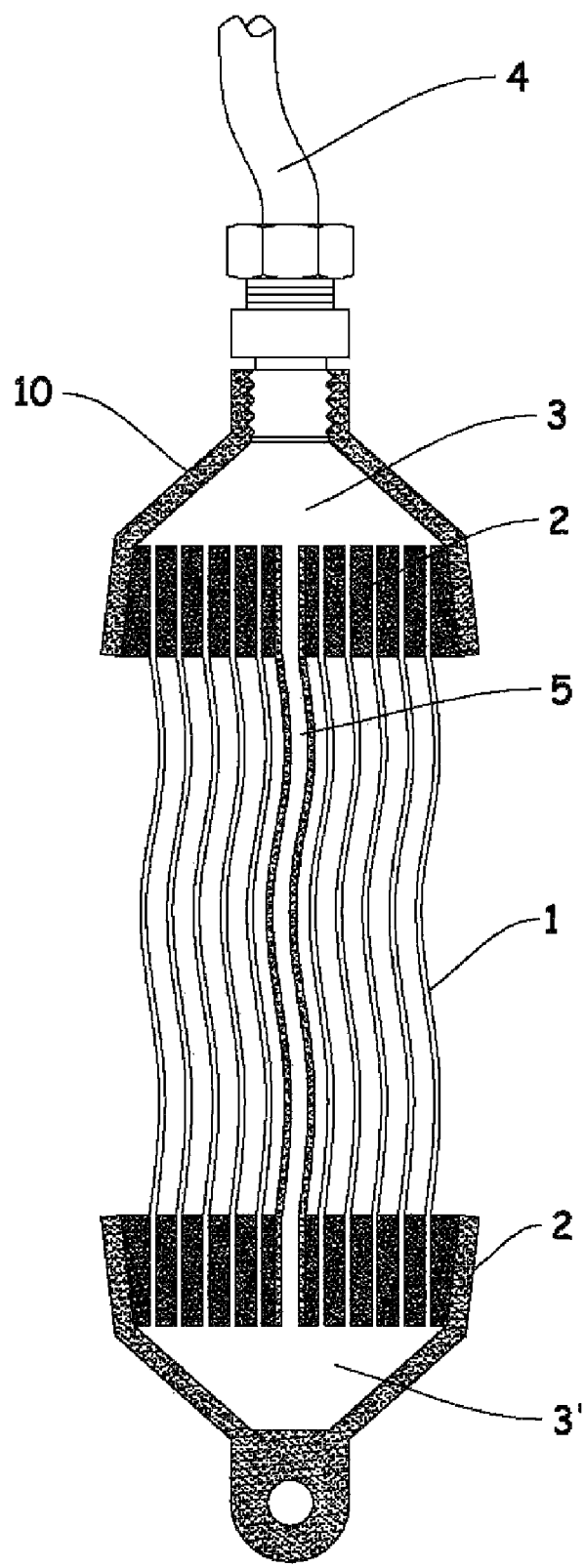
FIG. 1 is a profile view of a suspending hollow fiber porous membrane bundle (there is a water outlet tube in the membrane bundle) in this invention.

As shown in FIG. 1, a suspending hollow fiber porous membrane bundle, comprises a plurality of hollow fiber membrane yarns 1, casting heads 2 fixed on the ends of the yarns, water outlet end 10 and hollow tube 5. The membrane bundle that is completely immersed in the raw water to be filtered is composed of 300 hollow fiber porous membrane yarns 1 with 0.0 1 µm average pore size of the hollow fiber porous membrane yarn in cylinder shape of 50 mm diameter. Polyurethane is used to cast both ends of the membrane bundle inside the cylinder casting heads 2 with both ends open. Both ends of the hollow fiber membrane yarn 1 are casted into cylinder shape and placed into cast header 2 with cavities (that is water-collecting chambers 3, 3'), the water-collecting chamber 3 is connected with water outlet tube 4 through the water outlet end 10 and water outlet tube 4 is connected with the water-collecting system of the filtration system. The net length of the membrane yarn 1 between casting heads 2 at both ends of the membrane bundle is 1500 mm. The water-collecting chambers 3, 3' on each end of the membrane bundle are connected through a hollow tube 5. The produced water collected by the water-collecting chamber 3' on one end of the membrane bundle is transported to the other end 3 through hollow tube 5. The produced water from both ends is combined together and flows to the water-collecting system of the filtration system through water outlet end 10 and water outlet tube 4.

As a result, the hollow tube 5 is not only the water outlet tube, but can also prevent the damage on the membrane yarn caused by high oscillation amplitude of the membrane bundle and protect the membrane bundle. Flexible connections are used for both ends of the membrane bundle, wherein at least one end of the flexible connection uses the flexible tube and the hollow fiber porous membrane bundle is completely immersed into the liquid to be filtered. The fixtures on both ends of the membrane bundle can move within a certain range, therefore besides the membrane yarns that can be suspended, move and contact each other along with water flow and air flow, the complete membrane bundle can move within a range as well.

Example 2

Figure 2:
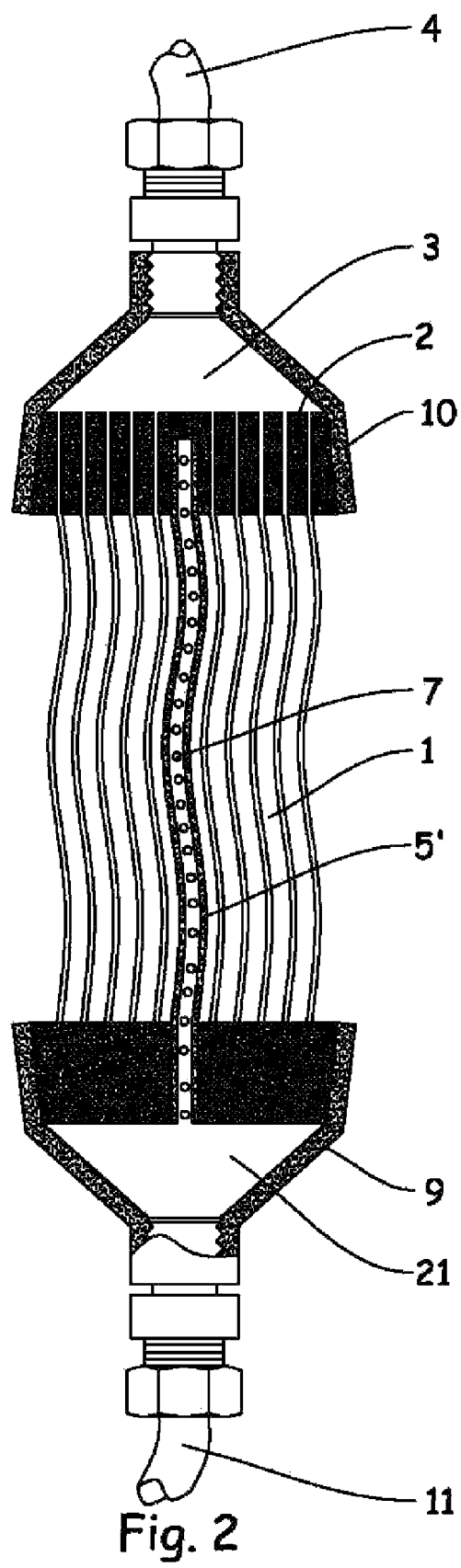
FIG. 2 is a profile view of a suspending hollow fiber porous membrane bundle (there is a air distribution tube in the membrane bundle) in this invention.

As shown in FIG. 2, a suspending hollow fiber porous membrane bundle, comprises a plurality of hollow fiber membrane yarns 1, casting heads 2 fixed on the ends of the membrane yarns, water outlet end 10 and air supply end 9. The membrane bundle, which is completely immersed inside the raw water to be filtered, is composed of 400 hollow fibers porous membrane yarns 1 with average pore size of 0.1 µm, with the diameter of the cylinder shape membrane bundle of 60 mm. Polyurethane is used to cast one end of the membrane bundle into the cylinder casting head 2 with the end open and with a cavity 3 (that is the water-collecting chamber). The water-collecting chamber 3 is connected to water outlet tube 4 through the water outlet end 10. Polyurethane is used to cast the other end of the membrane bundle into the cylinder casting head 2 with the end sealed. This casting head is placed in the cup to form cavity 21 (that is the air distribution chamber). The air distribution chamber 21 is connected to a first air supply tube 11 through air supply end 9. Water outlet tube 4 and air supply tube 11 are connected with the water collecting system and compressed air supply system of the filtration system respectively. The net length of the membrane yarn 1 between casting heads 2 at both ends of the membrane bundle is 1500 mm. There is a hollow tube 5' set in the membrane bundle with one end connected to the air distribution chamber 21 on one end of the membrane bundle and the other end binding with the corresponding membrane bundle cast header with the end sealed. There are air distribution holes 7 evenly distributed on the hollow tube 5', which can provide aeration on membrane yarns 1 during work. Therefore, the hollow tube 5' is not only the air distribution tube, but also can prevent the damage on membrane yarn 1 caused by high oscillation amplitude of the membrane bundle and protect the membrane bundle. Because flexible tube connections are used in both ends of the membrane bundle and the hollow fiber porous membrane bundle is completely immersed into the liquid to be filtered, the casting heads at both ends of the membrane bundle can move within a certain range. So besides the membrane yarns can float, move and contact each other along with water flow and air flow, the complete membrane bundle can move within a range as well.

Example 3

Figure 3:
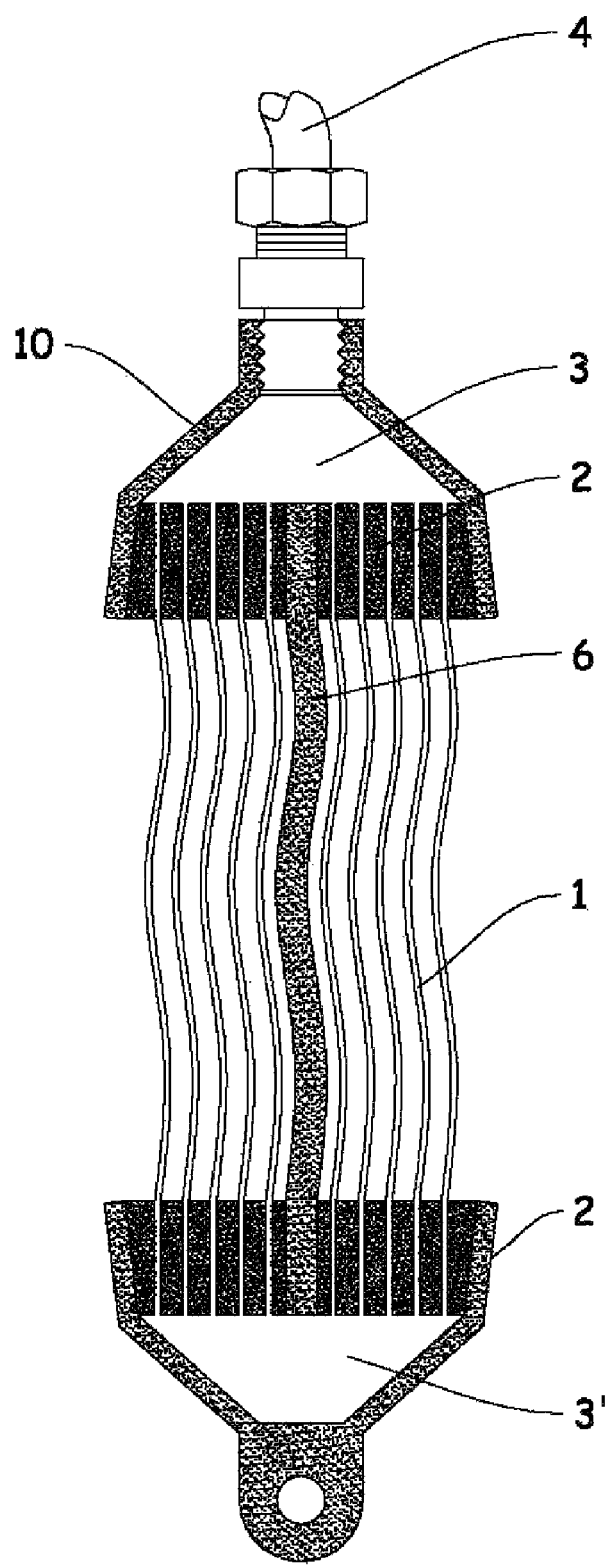
FIG. 3 is a profile view of a suspending hollow fiber porous membrane bundle (there is a cord in the membrane bundle) in this invention.

As shown in FIG. 3, a suspending hollow fiber porous membrane bundle comprises a plurality of hollow fiber membrane yarns 1, casting heads 2 fixed on the ends of the yarns, water outlet end and middle cord 6. The membrane bundle that is completely immersed in the raw water to be filtered is composed of 200 hollow fibers porous membrane yarns with average pore size of 0.21 µm, with the diameter of the cylinder shape membrane bundle of 60 mm. Polyurethane is used for both ends of the membrane bundle to cast in the cylinder cast header 2 with the ends open. Both ends of the hollow fiber membrane yarn 1 are casted into cylinder shape and placed into cast header 2 with cavities 3, 3' (that is the water-collecting chamber). The water-collecting chamber is connected to water outlet tube 4 through the water outlet end 10; the water outlet tube 4 is connected to the water-collecting system of the filtration system. The net length of the membrane yarn 1 between casting heads 2 at both ends of the membrane bundle is 1500 mm. In order to prevent the damage on membrane yarn caused by high oscillation amplitude of the membrane bundle, cord 6 is set up in the middle of the membrane yarn 1 and between the two casting heads on both ends to protect the membrane bundle. Because flexible connections are used for both ends of the membrane bundle and the hollow fiber porous membrane bundle is completely immersed into the liquid to be filtered, the casting heads 2 on both ends of the membrane bundle can move within a certain range, therefore, besides the membrane yarns that can float, move and contact each other along with water flow and air flow, the complete membrane bundle can move within a range.

Example 4

Figure 4:
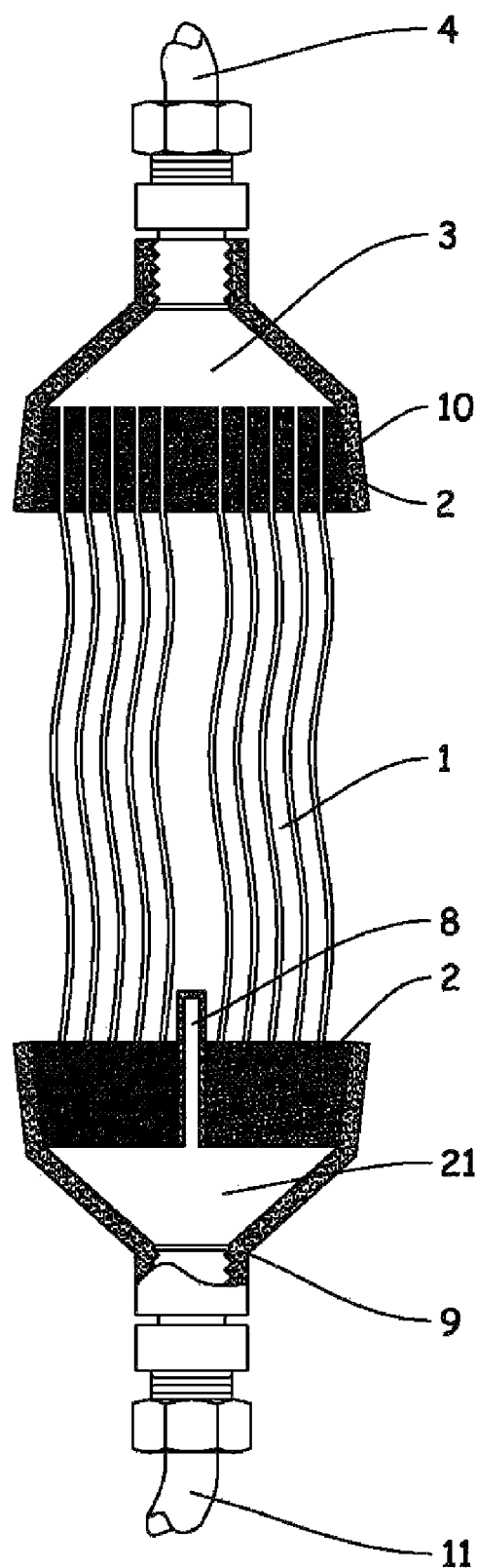
FIG. 4 is a profile view of a suspending hollow fiber porous membrane bundle (there is a short air distribution tube in the membrane bundle) in this invention.

As shown in FIG. 4, a suspending hollow fiber porous membrane bundle, comprises a plurality of hollow fiber membrane yarns 1, casting heads 2 fixed on the ends of the yarns, water outlet end and air supply end. The membrane bundle is completely immersed inside the raw water to be filtered and is composed of 200 hollow fiber porous membrane yarns 1 with an average pore size of 0.01 μm and with a diameter of the cylinder shape membrane bundle of 160 mm. Polyurethane is used to cast one end of the membrane bundle into the cylinder shape cast header with the end open. This end of the hollow fiber membrane yarn 1 is casted into cylinder shape and placed into cast header 2 with cavity 3 (that is water-collecting chamber). The water-collecting chamber 3 is connected with the water outlet tube 4 through the water outlet end. As shown in FIG. 4, polyurethane is used to cast the other end of the membrane bundle into the cylinder cast header 2 with the end sealed. The center of the cast header has a second air supply tube 8 extending to the center of membrane yarn 1, and there are air distribution holes over the tube. There is a cavity 21 (that is the air distribution chamber) in the cast header. The air distribution chamber 21 is connected to a first air supply tube 11 through air supply end. Water outlet tube 4 and the first air supply tube 11 are connected with the water-collecting system and compressed air supply system of the filtration system respectively. The net length of the membrane yarn 1 between casting heads 2 at both ends of the membrane bundle is 1000 mm. Because flexible tube connections are adopted in both ends of the membrane bundle and the hollow fiber porous membrane bundle is completely immersed into the liquid to be filtered, the casting heads at both ends of the membrane bundle can move within a certain range, therefore, besides the membrane yarns that can float, move and contact each other along with water flow and air flow, the complete membrane bundle can move within a range.

Example 5

Figure 5:
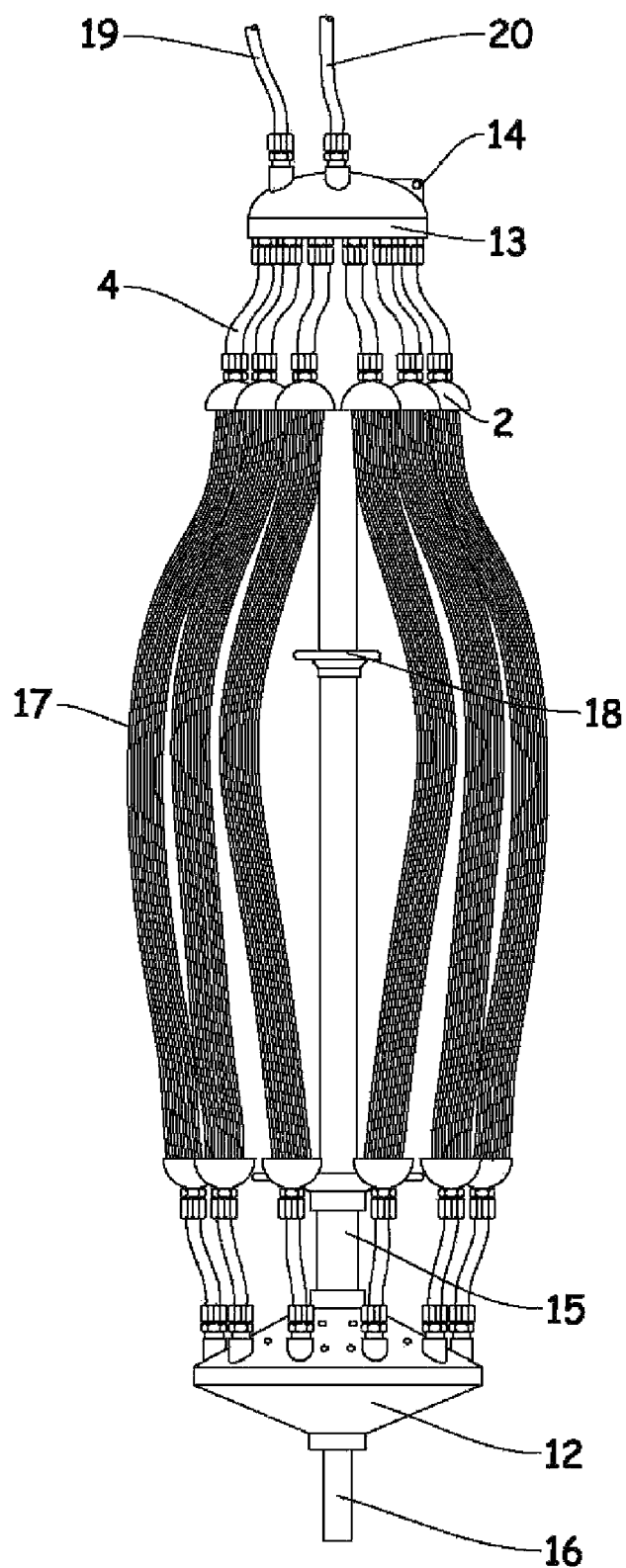
FIG. 5 is a partially cut away profile view of the membrane filtration module composed of several suspending hollow fiber membrane bundles in this invention.

As shown in FIG. 5, a membrane filtration module composed of a plurality of suspending hollow fiber porous membrane bundles in Example 2, comprising module head 13, casting heads 2 fixed on the ends of the membrane yarns, aeration head 12, central tube 15, water outlet tube 4, etc. and a plurality of hollow fiber porous membrane bundles 17 that surround the central tube 15 evenly and is completely immersed in the raw water to be filtered. Module head 13 and aeration head 12 are connected together through the central tube 15 with diameter of 40 mm. The size of the module head 13 is smaller than that of the aeration head 12 to make the whole module appear to be in tower shape, which helps the direction of air flow. The module head 13 is round, its diameter is 150 mm. the aeration head 12 is a double cone with 200 mm diameter and there are several air distributing holes in radial distribution. The conical angle is 120° for the upper conical surface of the aeration head 12. The conical angle for the lower conical surface is 130°. The side of aeration head 12 that is against the module head 13 has air pressure adjusting tube 16 that faces the central tube 15; the air pressure adjusting tube 16 can adjust the air pressure inside the aeration head 12 to increase the aeration result.

There is a hang ring 14 on module head 13 connected to the module bracket of the filtration system through flexible cord by flexible connection.

There are a water outlet tube 19 and an air distribution tube 20 on the module head 13, water outlet tube 19 is connected to water-collecting extension tube and outlet pump; air distribution tube 20 is connected to compressed air inlet extension tube and is connected with the aeration head 12 through central tube 15. The water to be purified goes through the pores on the walls of hollow fiber porous membrane to enter the inside of the hollow fiber porous membrane and flows into water-collecting tube and it is extracted by the pump. The two ends of the central tube 15 close to the module head 13 and the aeration head 12 have air exit leading board 18, which has the leading effect on the air flow coming from the aeration head 12, enhances the sweeping result for the ends of the hollow fiber porous membrane bundle to remove the pollutants.

Obviously, the abovementioned devices, processes and methods can be changed or modified by the technicians in this field within this invention. The above statement should be considered as an embodiment of the invention, instead of a kind of limit. This invention is appropriate for the purification treatments of surface water, underground water, municipal waste water, industrial waste water, etc. with high turbidity.

The invention claimed is:

1. A membrane filtration module comprising a plurality of membrane bundles flexibly connected between a module head and an aeration head;
   wherein a membrane bundle comprises: a plurality of hollow fiber porous membrane yarns extending between a first end and second end, a first casting head fixed on said first end of said yarns, and a second casting head fixed on said second end of said yarns; and
   wherein said first casting head is connected to said module head by a flexible water outlet tube.

2. The module of claim 1 wherein said second casting head is connected to said aeration head by a flexible cord.

3. The module of claim 2 wherein said first and second casting heads each include a water collection chamber, and said membrane bundle comprises a hollow tube connecting said water collection chambers.

4. The module of claim 1 wherein said second casting head is connected to said aeration head by a first air supply tube.

5. The module of claim 4 wherein said second casting head comprises an air distribution chamber and a second air supply tube connected to said air distribution chamber for distributing air within said membrane bundle.

6. The module of claim 5 wherein said second air supply tube comprises a first end connected to said air distribution chamber and a second end sealed and fixed to said first casting head.

7. The module of claim 1 comprising a central tube connected to said module head and aeration head.

8. The module of claim 7 wherein said module head comprises a water outlet tube and an air distribution tube, and wherein said air distribution tube is connected to said aeration head through said central tube.

9. A filtration system comprising: a water-collection extension tube, a compressed air inlet extension tube, and a plurality of membrane filtration modules wherein a module comprises:
- a plurality of membrane bundles flexibly connected between a module head and an aeration head,
- a central tube connected between said module head and said aeration head,
- said module head comprising a water outlet tube connected to said water-collection extension tube, and an air distribution tube connected to said compressed air inlet extension tube, and wherein said air distribution tube is connected to said aeration head through said central tube,
- wherein a membrane bundle comprises: a plurality of hollow fiber porous membrane yarns extending between a first end and second end, a first casting head fixed on said first end of said yarns, and a second casting head fixed on said second end of said yarns; and
- wherein said first casting head is connected to said module head by a flexible water outlet tube.

10. The filtration system of claim 9 wherein said second casting head of said membrane bundle is connected to said aeration head by a flexible cord.

11. The filtration system of claim 10 wherein said first and second casting heads each include a water collection chamber, and said membrane bundle comprises a hollow tube connecting said water collection chambers.

12. The filtration system of claim 9 wherein said second casting head of said membrane bundle is connected to said aeration head by a first air supply tube.

13. The filtration system of claim 12 wherein said second casting head comprises an air distribution chamber and a second air supply tube connected to said air distribution chamber for distributing air within said membrane bundle.

14. The filtration system of claim 13 wherein said second air supply tube comprises a first end connected to said air distribution chamber of said second casting head and a second end sealed and fixed to said first casting head.

15. A method of treating water using a filtration system of claim 9 wherein water is filtered by passing through hollow fiber porous membrane yarns and is transported from the yarns to a water-collection extension tube.

* * * * *